W. C. CARTER.
TEMPERATURE REGULATOR FOR AUTOMOBILE ENGINES.
APPLICATION FILED JAN. 3, 1916.
1,202,483.
Patented Oct. 24, 1916.
2 SHEETS—SHEET 1.
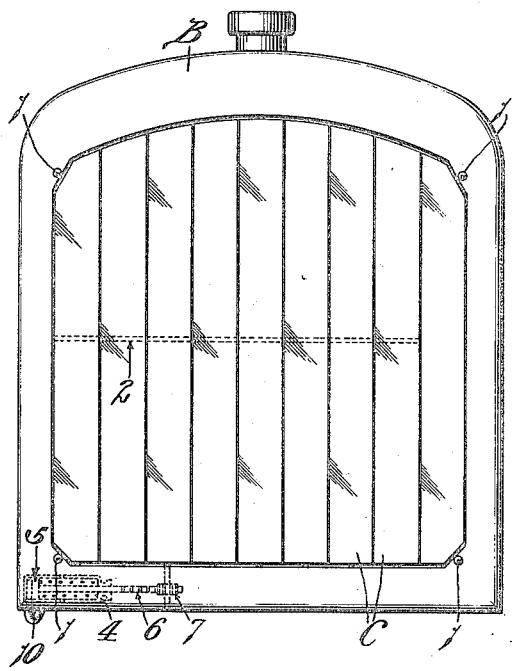
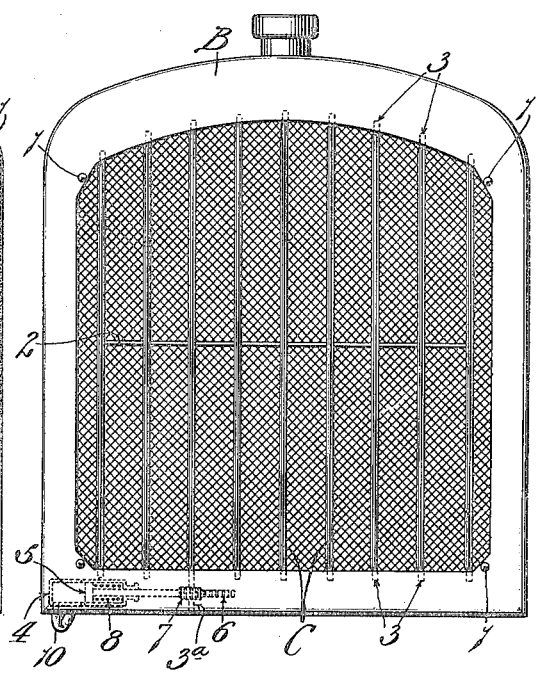
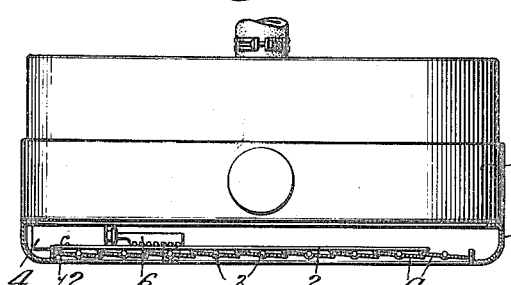
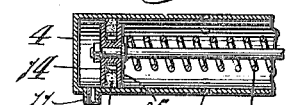
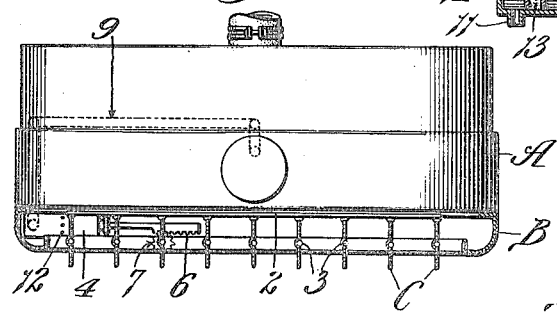
Inventor,
William C. Carter.
By Bakewell & Church, Attys.

W. C. CARTER.
TEMPERATURE REGULATOR FOR AUTOMOBILE ENGINES.
APPLICATION FILED JAN. 3, 1916.
1,202,483.
Patented Oct. 24, 1916.
2 SHEETS—SHEET 2.
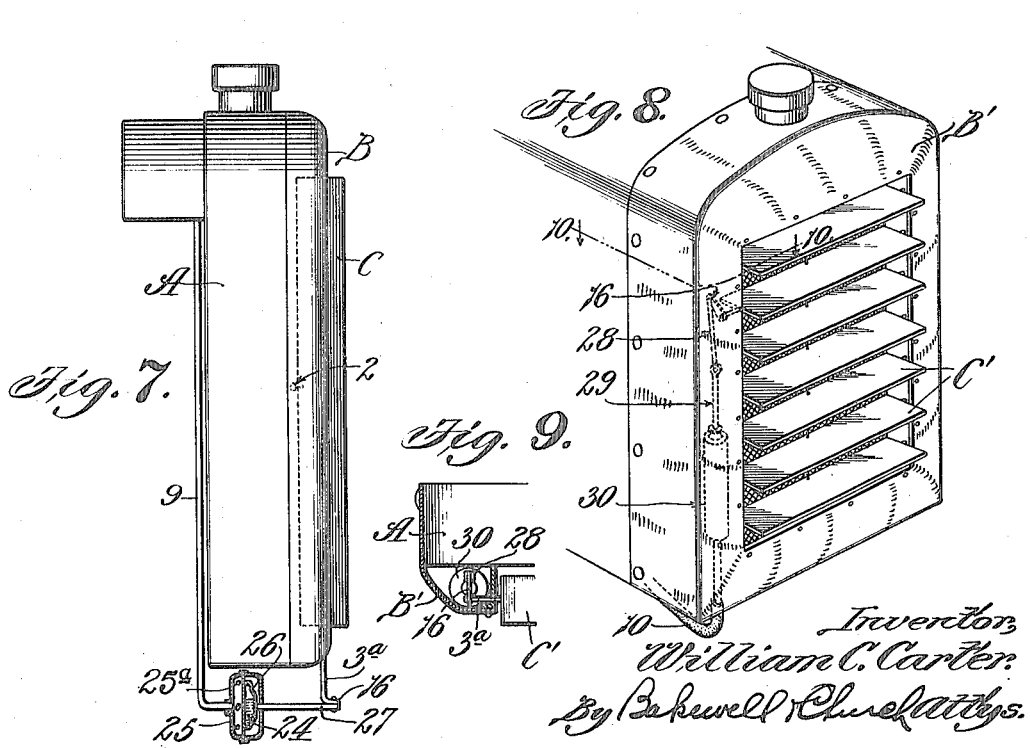

UNITED STATES PATENT OFFICE.

WILLIAM C. CARTER, OF ST. LOUIS, MISSOURI.

TEMPERATURE-REGULATOR FOR AUTOMOBILE-ENGINES.

1,202,483.  Specification of Letters Patent.  Patented Oct. 24, 1916.

Application filed January 3, 1916. Serial No. 69,977.

*To all whom it may concern:*

Be it known that I, WILLIAM C. CARTER, a citizen of the United States, residing at St. Louis, Missouri, have invented a certain new and useful Improvement in Temperature-Regulators for Automobile-Engines, of which the following is a full, clear, and exact description, such as will enable others skilled in the art to which it appertains to make and use the same.

This invention relates to devices that are used on automobiles in cold weather for diminishing or cutting off the supply of air used to absorb heat from the heat-radiating means of the engine. The device that is now generally used for this purpose on automobiles equipped with water-cooled engines consists of a hood or cover arranged over the radiator of the cooling system and provided with a flap that can be closed in extremely cold weather or when the engine is cold, so as to diminish or cut off the supply of air through the radiator, and opened in moderate weather or after the engine is warmed, so as to increase the supply of air through the radiator. One objectionable feature of a device of the character referred to is that it is practically impossible, even for a careful and skilled driver, to keep the flap of the hood adjusted in such a manner that the motor will be kept at the temperature at which it operates most efficiently, on account of the variations in the atmosphere, in the velocity of the wind and in the speed of the automobile when the machine is traveling on the road. Another objectionable feature of such a device is that the average automobile driver, either through carelessness or ignorance, frequently fails to open the flap of the radiator cover until after the engine has become overheated, or fails to close the flap in extremely cold weather to cause the engine to heat up to the proper temperature. And still another objectionable feature of such a device is that any readjustment of the flap necessitates stopping the automobile and wasting considerable time while the driver gets out and raises or lowers the flap of the radiator cover. The result is that the average automobile driver starts out in extremely cold weather with the flap closed and continues to run until the radiator steams. He then stops the automobile, gets out and opens the flap and thereafter leaves the flap in its open position, notwithstanding the fact that the engine soon cools off and remains at a temperature below the temperature at which it operates most efficiently. In moderate weather, even with the flap completely open, the radiator frequently steams, on account of the relatively small area of the radiator, that is exposed when the flap is opened, thus necessitating the complete removal of the radiator cover.

The main object of my invention is to provide a novel temperature regulator for automobile engines that will automatically control the supply of air used to absorb heat from the engine in such a manner that the engine will be maintained at the temperature at which it operates most efficiently, or at any other predetermined temperature.

Another object is to provide a novel temperature regulator for automobile engines that is of simple construction; that can be installed easily and which can be manufactured cheaply.

Figure 1 of the drawings is a front elevational view of the radiator of a water-cooled automobile engine equipped with a temperature regulator constructed in accordance with my invention, showing the apparatus that governs the passage of the air through the radiator in its closed position. Fig. 2 is a similar view, showing said apparatus in its open position. Fig. 3 is a top plan view of the radiator, showing the air-controlling apparatus on the front of same in horizontal section and in its closed position. Fig. 4 is a similar view, showing said apparatus in its open position. Fig. 5 is a side elevational view of the radiator, showing the frame of the air-controlling apparatus in vertical section. Fig. 6 is an enlarged longitudinal sectional view of the cylinder and the piston therein that automatically operates the air-controlling apparatus. Fig. 7 is a side elevational view, illustrating a radiator equipped with a diaphragm adapted to be operated by heat from steam generated in the radiator, for automatically operating the apparatus that controls the passage of the air through the radiator. Fig. 8 is a perspective view, illustrating still another form of my invention; and Fig. 9 is a horizontal sectional view, taken on the line 10—10 of Fig. 8.

Referring to Figs. 1 to 6 of the drawings which illustrate one form of my invention, A designates the radiator of a water-cooled automobile engine which consists of a member provided with water passageways that surround perforations in the member through which air passes, so as to absorb heat from the water that circulates through said passageways, and thus cool or reduce the temperature of the water before it reaches the water jackets of the cylinders of the engine. An apparatus is combined with the radiator A for governing the passage of air through the radiator, the apparatus herein shown consisting of a frame B provided with a plurality of hinged slats C that are adapted to be opened and closed, said slats C being connected to the frame B in any suitable manner and being preferably joined together so that they will move in unison into their open and closed positions. In the apparatus shown in Figs. 1 to 5 the frame B is arranged on the front of the radiator A and is retained in position by means of bolts or other suitable devices 1 that pass through the frame B and through perforations in the radiator A, and the slats C are operatively connected together by means of a cross bar or link 2 that is pivotally connected to each of the slats C. The slats C may be arranged either horizontally or vertically, and they are preferably connected to the frame B in such a manner that they will balance, or, in other words, will be free to swing in one direction or the other, this being effected by providing each slat with trunnions 3 arranged at the longitudinal axis of the slat, as shown in Figs. 3, 4 and 5. While I prefer to use an air-controlling apparatus that completely cuts off the passage of air through the radiator when the slats or movable elements of said apparatus are in their closed position, my broad idea contemplates the use of any suitable kind of device or apparatus for either completely cutting off the passage of air through the radiator or only partially cutting off the passage of air through the radiator. In the form of my invention illustrated in Figs. 1 to 6 the pressure of steam that is generated in the radiator A is utilized to automatically move the slats C into their open position, and a spring or other suitable device is used to close said slats. As shown in the drawings, a cylinder 4 is mounted in the lower portion of the frame B and a piston 5 is arranged in said cylinder for imparting movement to a rack bar 6 that meshes with a pinion 7 secured to an extension 3ª on the trunnion at the lower end of one of the slats C. A spring 8, arranged either on the inside of the cylinder 4 or in any other suitable position, tends to hold the piston 5 in the position shown in Fig. 6 and in broken lines in Fig. 1, thereby causing the slats C to remain in their closed position, and thus prevent air from passing through the radiator A. The radiator A is provided with an overflow pipe 9, such as automobile radiators are equipped with, and the lower end of this overflow pipe 9 is connected by a conduit 10 with one end of the cylinder 4, so that when steam is generated in the radiator A said steam will pass through the overflow pipe 9 and the conduit 10 into the cylinder 4 through an admission port 11 in the cylinder, thereby causing the piston 5 to move to the right, looking at Fig. 1, and thus move the slats C into their open position, as shown in Fig. 2. The air that passes through the radiator A as soon as the slats C are opened cools the radiator, and thus prevents the engine from becoming overheated, as would be apt to occur if air was not allowed to pass through the radiator after steam had started to generate in same. The steam or the water of condensation escapes from the cylinder 4 through one or more discharge ports 12 therein, and after the pressure in the radiator has dropped, the spring 8 moves the piston 5 in the opposite direction, namely, to the left, looking at Figs. 1 and 2, and thus restores the slats C to their closed position. Any suitable type of packing may be used for the piston 5, but I prefer to use a packing 13 of asbestos or some other suitable material that is arranged in an annular groove in the piston 5 and which is forced outwardly into snug engagement with the inner walls of the cylinder 4 by means of a spiral clock spring or other suitable expanding device 14 that is arranged in the annular groove in the piston that receives the packing 13, as shown in Fig. 6.

A temperature regulator of the construction above described insures an automobile engine being maintained at the temperature at which it operates most efficiently; it eliminates the possibility of the engine becoming overheated, due to carelessness or ignorance on the part of the driver of the automobile, and it overcomes the necessity of the driver stopping the automobile and getting out of same to manually adjust the apparatus that governs the passage of air through the radiator. When the automobile starts out on the road the slats C remain in their closed position, as shown in Fig. 1, until the temperature of the engine has been increased sufficiently to cause the water in the radiator to boil. As soon as steam is generated in the radiator A sufficient pressure is exerted on the piston 5 to cause said piston to move the slats C into their open position, as shown in Fig. 2, thereby permitting air to pass through the radiator and prevent an abnormal pressure from being created in the radiator. As soon as the pressure in the radiator becomes less than the force of the spring 8, said spring acts on the piston 5 or on the rack bar that is joined to said piston and causes the slats C to be restored to their closed position, thus cutting off the passage of air through the radiator A. It will thus be seen that when the automobile is traveling on the road the slats C open and close automatically, and thus prevent the engine from becoming overheated or from dropping below the temperature at which it operates most efficiently, as it is a well known fact that the average automobile engine is most efficient when the water in the cooling system is at approximately 200° Fahrenheit, or just a trifle below the boiling point.

In Fig. 7 I have illustrated another form of my invention, wherein the temperature, instead of the pressure of the steam that is generated in the radiator A, is utilized to open the movable elements of the apparatus that governs the passage of the air through the radiator. As shown in Fig. 7, a hollow diaphragm 24 filled with ether or some other volatile agent is arranged in a chamber 25 to which the overflow pipe 9 from the radiator leads, the expansible wall or movable wall 26 of said diaphragm being connected by means of a rod 27 with a crank arm 16 on the bottom trunnion of one of the slats C. When steam is generated in the radiator A the steam escapes through the overflow pipe 9 into the chamber 25, and thus heats up the diaphragm in said chamber, thereby causing said diaphragm to move the slats C into their open position. The chamber 25 is provided with one or more holes 25ª through which the excess steam can escape, and when the diaphragm cools the movable wall of same will flex in the opposite direction, and thus automatically close the slats C.

In Fig. 8 of the drawings I have illustrated an air-governing apparatus in which the slats C' are arranged horizontally in a frame B' that laps over the top and sides of the radiator A. Said slats are connected together by a link or rod and the trunnion at the end of one of the slats is provided with a crank arm 16 that is connected by means of a link 28 to the rod 29 of a piston arranged in a vertically disposed cylinder 30 mounted in the frame B', as shown in broken lines in Fig. 8. The overflow pipe of the radiator is connected by means of a conduit 10 with one end of the cylinder 30, so as to permit steam from the radiator to pass into the cylinder 30 and move the piston therein in such a direction that it will automatically open the slats C' in practically the same manner as in the form of my invention shown in Figs. 1 to 6, the cylinder 30 being of substantially the same construction as the cylinder 4 shown in Fig. 6 and being provided with one or more openings (not shown) through which the steam can escape from the cylinder after the piston in the cylinder has been actuated.

Having thus described my invention, what I claim and desire to secure by Letters Patent, is:

1. A temperature regulator for water-cooled automobile engines, comprising an apparatus that is adapted to be applied to the radiator of the cooling system and which consists of a frame provided with a plurality of hinged slats that are connected together, a cylinder provided with a piston that is adapted to be operated by the pressure of steam generated in the radiator for automatically opening said slats, a spring that causes said piston to restore said slats to their closed position, and an opening in said cylinder through which the steam or the water of condensation can escape when said piston reaches a certain position.

2. A temperature regulator for water-cooled automobile engines, comprising a plurality of movable members that are adapted to be opened and closed to govern the passage of air through the radiator of the cooling system, means that tends to hold said members normally in their closed position, and means for opening said members automatically consisting of an element that is rendered operative by the steam which escapes from said radiator.

In testimony whereof I hereunto affix my signature in the presence of two witnesses, this twenty-ninth day of December 1915.

WILLIAM C. CARTER.

Witnesses:
 WELLS L. CHURCH,
 GEORGE BAKEWELL.